United States Patent
Chen

(10) Patent No.: US 11,242,114 B2
(45) Date of Patent: Feb. 8, 2022

(54) CHAINLESS BICYCLE FOR CHILD

(71) Applicant: TIANJIN XUFENG SPORTS EQUIPMENT MANUFACTURE CO., LTD., Tianjin (CN)

(72) Inventor: Yu-Chi Chen, Tianjin (CN)

(73) Assignee: TIANJIN XUFENG SPORTS EQUIPMENT MANUFACURE CO., LTD., Tianjin (CN)

( * ) Notice: Subject to any disclaimer, the term of this patent is extended or adjusted under 35 U.S.C. 154(b) by 163 days.

(21) Appl. No.: 16/674,978

(22) Filed: Nov. 5, 2019

(65) Prior Publication Data

US 2021/0129942 A1  May 6, 2021

(51) Int. Cl.
*B62M 11/02* (2006.01)
*B62K 9/00* (2006.01)

(52) U.S. Cl.
CPC .............. *B62M 11/02* (2013.01); *B62K 9/00* (2013.01)

(58) Field of Classification Search
CPC . B62K 9/00; B62K 9/02; B62K 13/00; B62M 11/02
See application file for complete search history.

(56) References Cited

U.S. PATENT DOCUMENTS

| | | | | |
|---|---|---|---|---|
| 2,687,897 A | * | 8/1954 | Wells | B62M 11/02 280/260 |
| 5,002,296 A | * | 3/1991 | Chiu | B62M 11/02 280/260 |
| 7,798,513 B1 | * | 9/2010 | Salvant | B62H 7/00 280/304.3 |
| 10,300,974 B1 | * | 5/2019 | O'Reilly | B62H 7/00 |
| 2004/0201199 A1 | * | 10/2004 | Liebetrau | B62K 9/00 280/278 |
| 2016/0001843 A1 | * | 1/2016 | Evans | B62K 13/08 280/7.17 |

* cited by examiner

*Primary Examiner* — Tony H Winner
(74) *Attorney, Agent, or Firm* — Muncy, Geissler, Olds & Lowe, P.C.

(57) ABSTRACT

A chainless bicycle for child includes a frame and a power gearing device. The frame has a seat tube between the front wheel and the rear wheel, with a passive gear axially disposed on a hub of the rear wheel. The power gearing device is disposed on the frame between the seat tube and the rear wheel. The power gearing device includes an active gear and a transmission gear meshed with the active gear. The transmission gear is meshed between the active gear and the passive gear. The power gearing device further includes a crank set disposed on two sides of the active gear for driving the active gear to rotate. Therefore, the passive gear is driven through the transmission gear to rotate in an identical direction with the active gear. Thus, the meshing structure of the present invention improves the safety of children.

3 Claims, 2 Drawing Sheets

CHAINLESS BICYCLE FOR CHILD

BACKGROUND OF THE INVENTION

1. Field of the Invention

The present invention relates to bicycles for child, and more particularly, to a chainless bicycle for child.

2. Description of the Related Art

A bicycle for child is usually applied as a moving tool for children at an age before school. During the bicycle pedaling process, the child has to actively pedal the bicycle pedals for driving the gear of the bicycle to rotate. Therein, the gear is connected with the rear wheel through a chain, so as to drive the rear to rotate in an identical direction with the gear. Therefore, the child pedals to move the bicycle forward.

However, during the transmission process, the chain of the bicycle easily engages the pants or skirt of the child, causing the damage of clothes, and even causing the child to tumble. Also, during playing, the child may accidentally insert fingers into the gap between the chain and the gear, such that the finger may be stuck therein and suffer from damage.

SUMMARY OF THE INVENTION

The present invention mainly aims at the purpose of resolving the possibility of children being accidentally damaged by the chain of the bicycle. Therefore, a chainless bicycle for child is disclosed. By replacing the chain transmission with the mesh transmission of the gear set, the bicycle riding safety for child is improved.

For achieving the aforementioned objectives, a chainless bicycle for child is provided, comprising a frame and a power gearing device. A front wheel and a rear wheel are disposed on the front side and the rear side of the frame, respectively, with a seat tube disposed on the frame and positioned between the front wheel and the rear wheel. The frame further comprises a passive gear which is axially disposed on a hub of the rear wheel. The power gearing device is removably disposed on the frame, and connected between the seat tube and the rear wheel. The power gearing device comprises an active gear and a transmission gear meshed to be driven by the active gear. The active gear is disposed on the bottom end of the seat tube, and the transmission gear is meshed between the active gear and the passive gear. The power gearing device further comprises a crank set axially connected with two sides of the active gear for driving the active gear to rotate, whereby the passive gear is driven together by the transmission gear, so as to rotate in an identical direction with the active gear.

Therefore, the power gearing device is structurally simple and removably disposed on the frame. By the linkage relationship between the active gear and the transmission gear of the power gearing device, the chain transmission function of the conventional bicycle is replaced, and the passive gear of the frame is driven to rotate in the identical direction with the active gear, thereby driving the frame to move forward.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
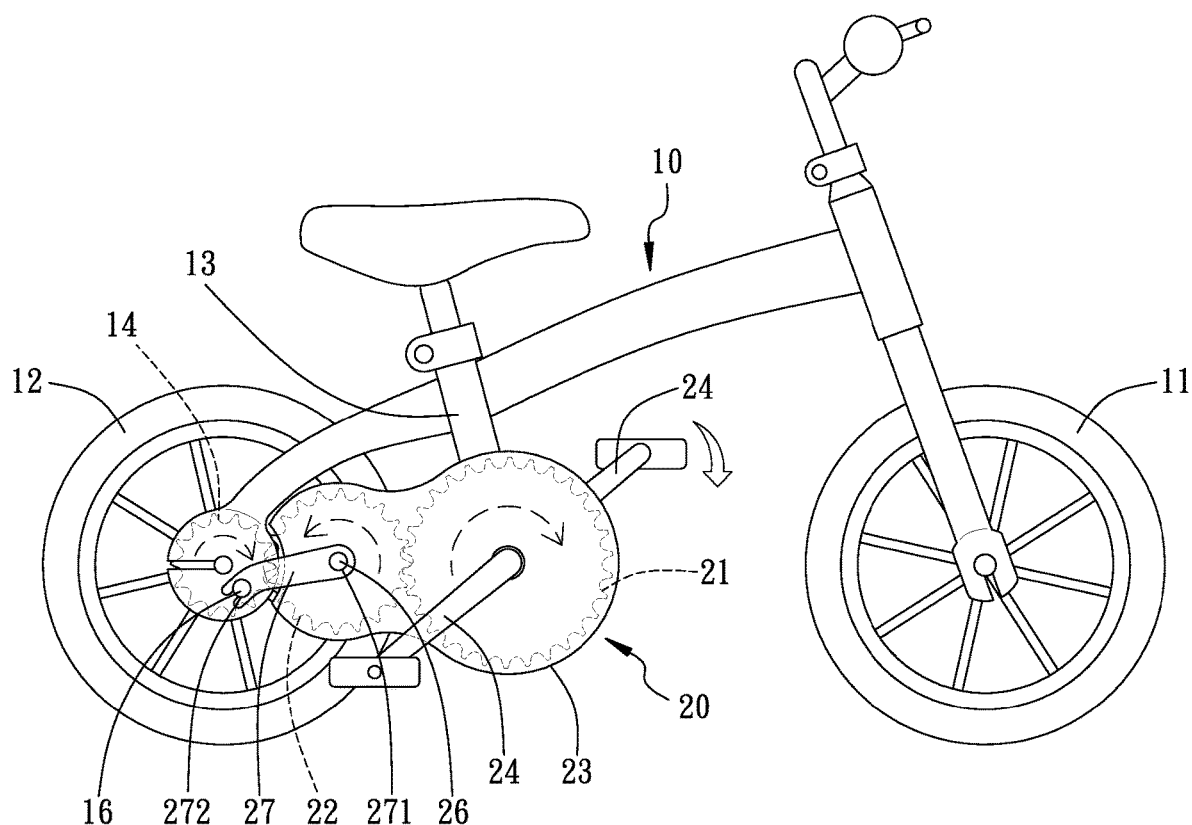
FIG. 1 is a lateral perspective view in accordance with an embodiment of the present invention.
Figure 2:
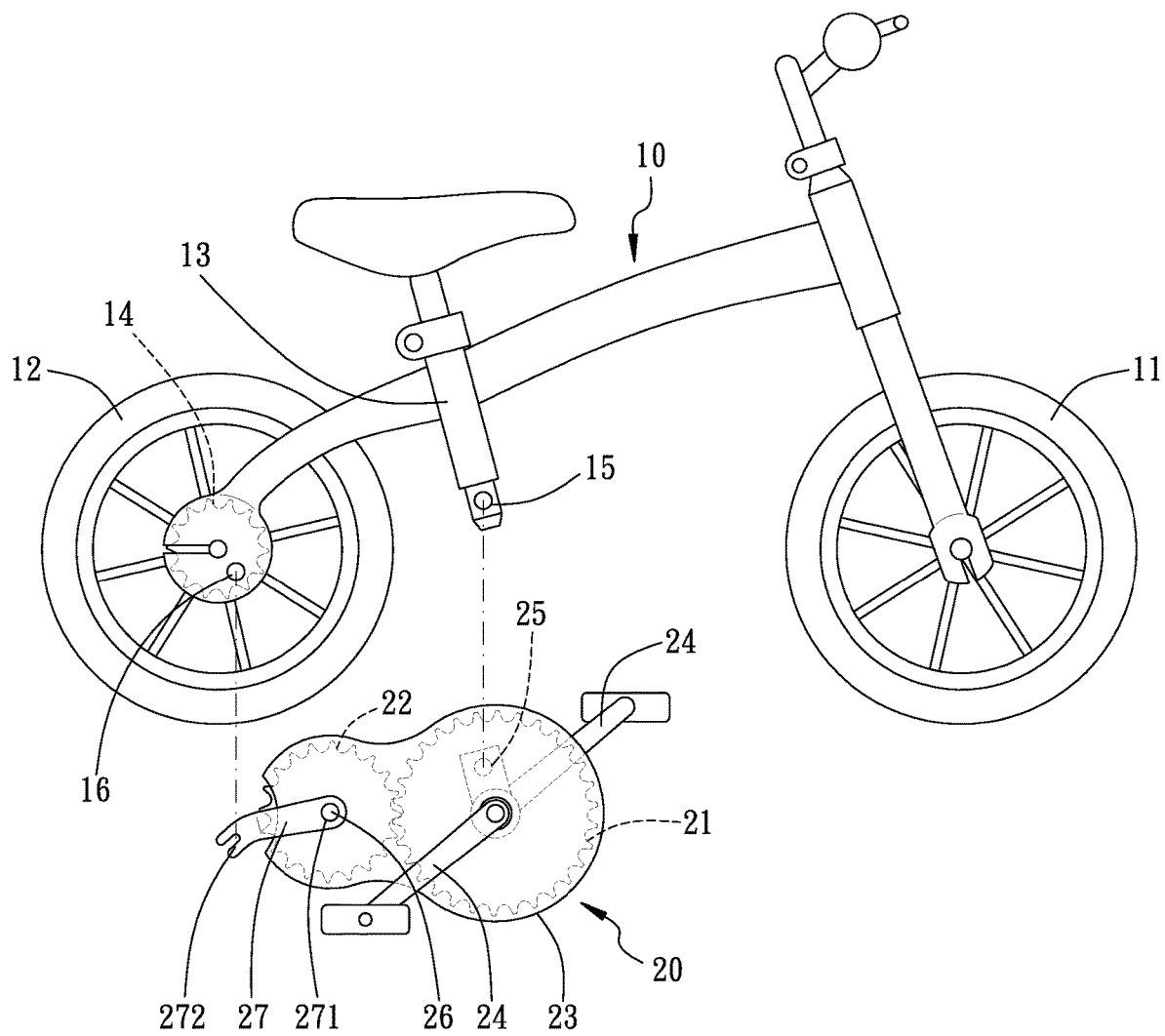
FIG. 2 is a partially exploded view in accordance with an embodiment of the present invention.

Referring to FIG. 1 and FIG. 2, a chainless bicycle for child in accordance with an embodiment of the present invention is provided, comprising a frame 10, and a power gearing device 20.

The frame 10 has a front wheel 11 and a rear wheel 12 disposed on the front side and the rear side of the frame 10, respectively, with a seat tube 13 disposed between the front wheel 11 and the rear wheel 12, such that the saddle is received on the top end of the seat tube 13. Also, the frame 10 further comprises a passive gear 14 axially disposed on a hub of the rear wheel 12.

The power gearing device 20 is removable disposed on the frame 10 and connected between the rear wheel 12 and the seat tube 13. Referring to FIG. 1 and FIG. 2, the power gearing device 20 comprises an active gear 21 and a transmission gear 22 which is meshed and driven by the active gear 21. The active gear 21 is disposed on the bottom end of the seat tube 13 of the frame 10. The transmission gear 22 is meshed between the active gear 21 and the passive gear 14. In the embodiment, the power gearing device 20 further comprises a shell 23 for enclosing the active gear 21 and the transmission gear 22 that are meshed together, such that the active gear 21 and the transmission gear 22 are hidden in the shell 23. Also, the shell 23 opens on one side thereof in adjacent to the rear wheel 12 of the frame 10, and the transmission gear 22 of the power gearing device 20 is partially exposed from the shell 23 to be meshed with the passive gear 14 of the frame 10, such that the active gear 21, the transmission gear 22, and the passive gear 14 are meshed together. Therein, the tooth number of the active gear 21 is larger than the tooth number of the transmission gear 22, and the tooth number of the transmission gear 22 is larger than the tooth number of the passive gear 14. In other words, when the active gear 21 rotates by one round, the passive gear 14 rotates by more than one rounds than the active gear 21. Therefore, the active gear 21, through the linkage with the transmission gear 22, drives the passive gear 14 of the frame 10 to rotate in a direction identical to the rotation direction of the active gear 21. Also, the ratio of the tooth numbers between the active gear 21 and the passive gear 14 is suitable for a pedaling operation carried out by children.

Also, the power gearing device 20 further comprises a crank set 24 axially connected with two sides of the active gear 21, respectively. Each crank set 24 has an end pivotally connected with a shaft of the active gear 21, and another end provided with a pedal. When the child pedals the crank set 24, the crank set 24 drives the active gear 21 to rotate in a forward direction, and the active gear 21 drives the transmission gear 22 to rotate in a backward direction, whereby the passive gear 14 is driven by the transmission gear 22 to rotate in the forward direction identical with the active gear 21. Therefore, the frame 10 is driven by the power gearing device 20 to move forward.

Further, the power gearing device 20 of the present invention is efficiently installed on or removed from the frame 10. Referring to FIG. 2 illustrating one lateral side of the frame 10, the frame 10 comprises a seat tube connection portion 15 and a rear wheel connection portion 16. The seat tube connection portion 15 is disposed on the bottom end of the seat tube 13, and the rear wheel connection portion 16 is a protrusion rod protruding on two sides of the rear wheel 12. The power gearing device 20 comprises a first assemble portion 25, a second assemble portion 26, and two connection shafts 27. The first assemble portion 25 is disposed on the outer side of the shell 23 corresponding to the active gear 21. The first assemble portion 25 is arranged in alignment with the seat tube connection portion 15 and fastened thereon through a fastener (not shown). The second assemble portion 26 is arranged in alignment with the shaft of the transmission gear 22 and disposed on two sides of the shell 23. The connection shafts 27 are disposed on two sides of the shell 23 of the power gearing device 20, respectively, and each connection shaft 27 is applied for connecting the rear wheel connection portion 16 of the frame 10 and the second assemble portion 26 of the power gearing device 20. In detail, each connection shaft 27 comprises a fix end 271 and a combination end 272, and each fix end 271 is arranged in alignment with the second assemble portion 26 and fastened thereon through a fastener. Each combination end 272 is a recess portion, so as to be combined with the rear wheel connection portion 16 of the frame 10. Therefore, the power gearing device 20 is able to be efficiently assembled to and disassembled from the frame 10.

Therefore, the present invention replaces the conventional chain transmission mechanism with the meshing relationship among the active gear 21 and the transmission gear 22 of the power gearing device 20 and the passive gear 14 of the frame 10, whereby the passive gear 14 of the frame 10 is driven to rotate in an identical direction with the active gear 21 for driving the frame 10 to move forward. Also, the meshing structure between the active gear 21 and the transmission gear 22 of the power gearing device 20 is not exposed to external environment. Therefore, the child is prevented from accidental damage caused by the meshing transmission between the active gear 21 and the transmission gear 22, so that the safety during the usage of the bicycle is improved.

Furthermore, the power gearing device 20 is structurally simple. Also, the power gearing device 20 applies the first assemble portion 25, the second assemble portion 26, and the two connection shaft 27 that are directly fastened on the seat tube connection portion 15 and the rear wheel connection portion 16 of the frame 10, achieving the assembling and disassembling efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A chainless bicycle for child, comprising:
a frame comprising a front wheel and a rear wheel disposed on a front side and a rear side of the frame, respectively, with a seat tube disposed between the front wheel and the rear wheel, and a passive gear axially disposed on a hub of the rear wheel; and
a power gearing device removable disposed on the frame and connected between the seat tube and the rear wheel, the power gearing device comprising an active gear and a transmission gear meshed with the active gear, the active gear disposed on a bottom end of the seat tube, the transmission gear meshed between the active gear and the passive gear, the power gearing device further comprising a crank set axially connected on two sides of the active gear, the crank set driving the active gear to rotate, such that the passive gear is driven by the transmission gear to rotate in a direction identical to a rotation direction of the active gear;
wherein the power gearing device comprises a shell for enclosing the active gear and the transmission gear; the shell opens on one side thereof in adjacent to the rear wheel, such that the transmission gear is partially exposed from the shell to be meshed with the passive gear;
wherein the frame comprises a seat tube connection portion and a rear wheel connection portion; the seat tube connection portion is disposed on the bottom end of the seat tube, and the rear wheel connection portion is disposed on two sides of the rear wheel; the power gearing device comprises a first assemble portion and a second assemble portion; the first assemble portion is disposed on an outer side of the shell corresponding to the active gear, and the first assemble portion is arranged in alignment with the seat tube connection portion and fastened on the seat tube connection portion through a fastener; the second assemble portion is disposed on two sides of the shell corresponding to a shaft of the transmission gear; the power gearing device further comprises two connection shafts disposed on two sides of the shell, respectively, for connecting the rear wheel connection portion and the second assemble portion.

2. The bicycle of claim 1, wherein each of the connection shafts comprises a fix end and a combination end; the fix end is fastened with the second assemble portion; the rear wheel connection portion is a protrusion rod; and the combination end is a recess portion and combined with the rear wheel connection portion.

3. The bicycle of claim 1, wherein a tooth number of the active gear is larger than a tooth number of the transmission gear, and the tooth number of the transmission gear is larger than a tooth number of the passive gear.

* * * * *